Figure 1:
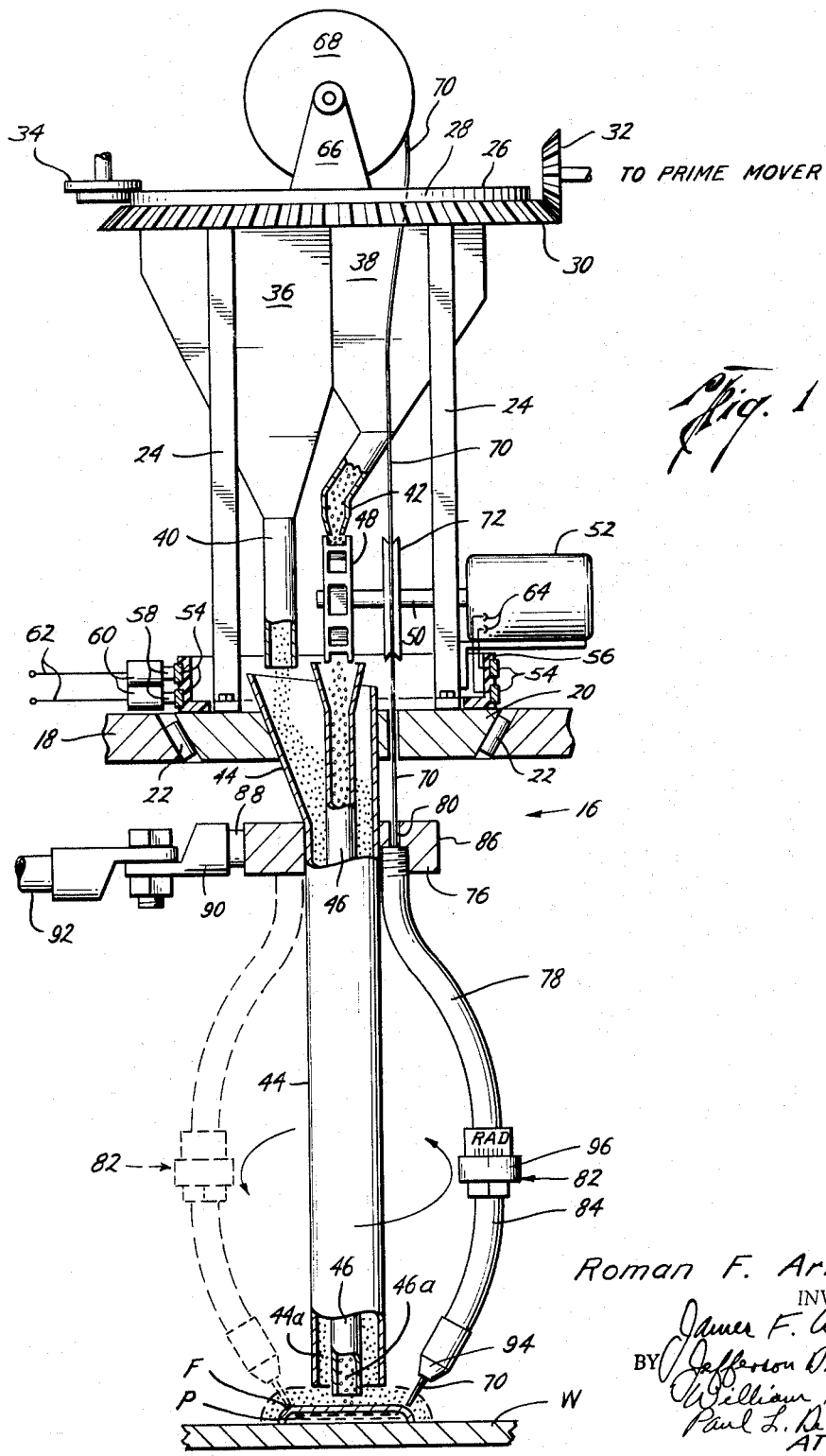

July 12, 1966  R. F. ARNOLDY  3,260,834
WELDING METHOD AND APPARATUS
Filed Sept. 22, 1964  2 Sheets-Sheet 1

Roman F. Arnoldy
INVENTOR.
ATTORNEYS

July 12, 1966   R F. ARNOLDY   3,260,834
WELDING METHOD AND APPARATUS
Filed Sept. 22, 1964   2 Sheets-Sheet 2

60 OSCILLATIONS/MIN.
12 IN./MIN. TRAVEL

60 REV./MIN.
12 IN./MIN. TRAVEL

240 REV./MIN.
12 IN./MIN. TRAVEL

Roman F. Arnoldy
INVENTOR.

BY
ATTORNEYS

United States Patent Office 3,260,834
Patented July 12, 1966

3,260,834
WELDING METHOD AND APPARATUS
Roman F. Arnoldy, Houston, Tex., assignor to R. I. Patents, Inc., Houston, Tex., a corporation of Texas
Filed Sept. 22, 1964, Ser. No. 398,177
25 Claims. (Cl. 219—73)

The present invention relates to an improved method of welding and improved apparatus for welding.

A very accurate and uniform analysis is required in corrosion resistant and other alloy welds and weld overlays. Certain imperfections are inherent in the methods and apparatus used in prior arc welding processes and equipment. These inherent imperfections make it difficult to meet the requirements on certain corrosion resistant and other alloy welds.

For example, in the prior art processes, the arc is oscillated from side to side across the pile and as it is so oscillated it passes over a heavy mass of granular metal at the center of the pile and light to no metal at the sides of the pile. Thus, each cycle of oscillation is not fully uniform in melting power and mixing of the weld alloy may not be as complete as is required to produce the precision alloy weld desired. Each increment of length of the weld contains material melted under different conditions.

Also, the oscillated path of the arc does not uniformly traverse the area to be welded. This causes a concentration of melting power in some areas and a scarcity in others. This reciprocating type of oscillation does not uniformly cover the area to be welded or weld overlaid since the arc paths are close together at some points and far apart in others as subsequently more fully explained.

Another typical difficulty with the prior art is that it is difficult to obtain smooth bead edges when making low fluidity alloys or when welding with high travel speeds. As more fully explained later, the space between the arc tracks at the bead edges are relatively wide and it is impractical to improve this condition by increasing the oscillation speed because of the inertia effects created when the electrode is required to decelerate to zero and accelerate to full speed across the bead almost instantaneously resulting in vibration of the whole welding head assembly and instability of the welding action.

The nonuniformity of the oscillated arc path and the space between the arc tracks at the bead edges cause a variation in the penetrating power of the welding action and provides more penetration than desired at one point in the bead and less than that desired at others.

Some granular metallic raw materials used in alloy welding melt and disseminate relatively slowly because of their size, shape or melting point, or combinations of them. In the prior arc welding processes and equipment this resulted in unmelted raw materials being left in the final deposit because the time between melting and freezing of the new materials was too short to melt these materials. Thorough mixing during welding is a function of time and the rapid melting and freezing of the puddle with the usual arc oscillation sometimes leaves some of these materials or ingredients unmelted.

In addition, the shape and depth of the alloy pile on the work also causes variations in melting conditions when utilizing the oscillating arc method and apparatus of the prior art.

Thus, the prior art oscillating arc method and apparatus is intermittent rather than continuous in nature, not fully uniform in melting capacity and contains some not easily controlled variables which make the high degree of accuracy and uniformity required in some alloy welds difficult or nearly impossible of attainment.

While highly satisfactory results and welds of closely controlled analysis are obtained by my prior method and apparatus, U.S. Patent Nos. 3,076,888 and 3,060,307, utilizing an oscillating arc, it would be highly desirable to eliminate the difficulties of the oscillating arc method and apparatus used in the method. The present invention is directed to a method and apparatus which eliminates the difficulties of the oscillating arc system and provides the production of alloys and weld deposits with analysis accuracy and uniformity levels unattainable by the oscillating arc system.

It is therefore an object of the present invention to provide a method of and apparatus for arc welding which eliminates the inherent difficulties and disadvantages of the oscillating arc welding systems.

Yet a further object of the present invention is the provision of an arc welding process and apparatus which will provide alloy and weld deposits with a high degree of accuracy of analysis and uniformity.

A further object of the present invention is the provision of an arc welding method and apparatus in which the melting of the alloy and weld deposits is continuous and uniform.

A still further object of the present invention is the provision of an arc welding method and apparatus in which the arc is maintained the same distance from continuously entering granular metal to the weld area resulting in completely continuous and uniform melting of the alloys and weld deposits.

A still further object of the present invention is the provision of an arc welding method and apparatus in which the melting of the deposited materials is not intermittent or incremental but truly continuous.

Yet a further object of the present invention is the provision of an arc welding method and apparatus in which the arc path crosses and crisscrosses the weld deposit in a tight pattern leaving no areas essentially not covered by the arc, and in which each is traversed over or near to by the arc twice, once each by the leading and once each by the trailing side of the arc.

A further object of the present invention is the provision of an arc welding method and apparatus in which the energy requirement (amperes×time increment) is lower over a given point during welding thus decreasing the tendency of the arc to drive through to the base and thus eliminating contamination of the base metal due to excess penetration and scattering of the deposited weld material.

A further object of the present invention is the provision of a continuous arc welding process and apparatus in which the arc power is proportioned between melting capacity and bonding capacity (penetration) so as to strike a proper balance for the requirements for a given weld material and to do so without the necessity of changing the amount of power.

A further object of the present invention is the provision of an arc welding method and apparatus in which the arc is rotated, rather than oscillated, and in which the rotational speed of the arc can be increased to speeds higher than oscillating arcs to cause essentially complete coverage of the whole weld area by the arc since there is no start and stop motion of the arc across the bead as in oscillating the arc.

Yet a further object of the present invention is the provision of an arc welding method and apparatus in which high arc rotation speeds are possible resulting in lower energy inputs at any given point in the weld which eliminates any tendency of the arc to drive through the weld deposit to the base.

A still further object of the present invention is the provision of an arc welding method and apparatus in which no gaps are left between arc paths at the bead edges resulting in smooth bead edges.

Yet a further object of the present invention is the provision of an arc welding method and apparatus in which the pile is of uniform depth and no pile of varying depth is traversed by the arc in its motion across the bead.

A still further object of the present invention is the provision of an arc welding method and apparatus in which a time lag or sufficient "cooking time" is provided in order to melt the harder to melt materials.

Yet a further object of the present invention is the provision of an arc welding method and apparatus in which the size of the puddle may be increased to a relatively large size by increasing the radius of rotation of the arc thereby providing a larger puddle size and hence a time lag or "cooking time" to melt harder to melt materials.

Yet a further object of the present invention is the provision of an arc welding method and apparatus in which an optimum puddle size may be provided for any given weld metal.

A still further object of the present invention is the provision of an arc welding method and apparatus in which larger bead widths may be used since the traverse melting conditions are uniform and are of high enough speed.

Yet a further object of the present invention is the provision of an arc welding method and apparatus in which rotational arc speeds can be used which prevent freezing of the deposited weld before the arc comes back on the return stroke.

Yet a further object of the present invention is the provision of an arc welding method and apparatus in which very large puddles can be made since the rotational speeds of the arc can be fast enough to prevent freezing of the puddle before the arc comes back on the return stroke.

A further object of the present invention is the provision of an arc welding method and apparatus in which the use of shielding gas is practical in that the arc does not contact the granular material being deposited, thus eliminating scattering of the granular material, and is thus fully usable with shielding gas.

A still further object of the present invention is the provision of an arc welding method and apparatus in which the radius of rotation of the arc is an adjustable variable for proportioning the amount of power used for melting and that used for bonding which varies depending on the melting characteristics, melting point, size and shape of granular metal, and the bonding characteristics, puddle temperature and depth and work or base metal melting point, of the material being applied and the material of the base.

Figure 2:
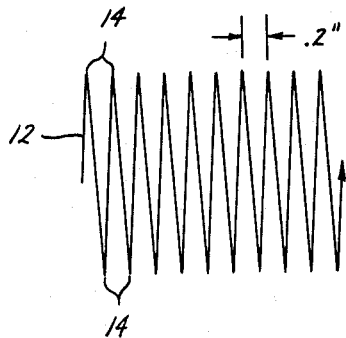
Figure 3:
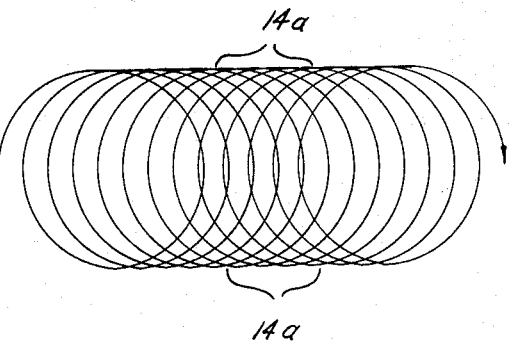
Figure 4:
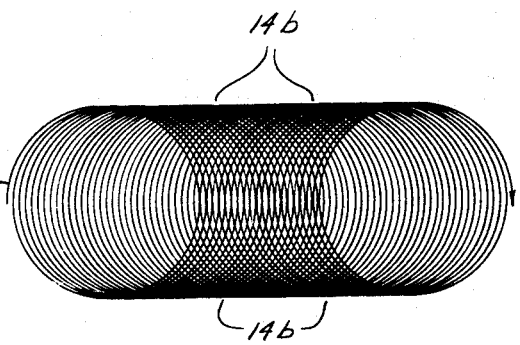

Other and further objects, features and advantages of the present invention will be apparent from the following description of presently-preferred embodiments thereof, taken in conjunction with the accompanying drawings, in which like character references designate like parts throughout the several views, and where FIGURE 1 is an arc welding apparatus according to the invention and useful in the method of the invention, FIGURE 2 is a schematic illustration of an oscillating arc path of the prior art, FIGURE 3 is a schematic representation of a rotating arc path according to the invention, and FIGURE 4 is a view similar to that of FIGURE 3 illustrating the path of a rotating arc in which the revolutions of the arc per minute have been increased fourfold while maintaining the same general rate of travel along the length of the weld.

Referring first to FIGURE 2, the path 12 of an arc oscillated in a typical manner is illustrated. This is a typical oscillation pattern in which the travel of the arc is twelve inches per minute and there are sixty oscillations of the arc per minute. The arc path 12 at the bead edges 14 is spaced, and, in this example, is spaced .2 inch apart. A visual examination of the arc path 12 clearly indicates that the oscillating path is nonuniform and considerable spacing is provided between the arc path at the bead edges 14. This non-uniformity provides some of the inherent difficulties and problems previously mentioned.

Referring now to FIGURES 3 and 4, in which the reference letters "a" and "b" have been added to the parts corresponding to those of FIGURE 2 for convenience of reference, paths of arcs in a rotary direction are illustrated, the arc making the path 12a in FIGURE 3 traveling at the rate of 60 revolutions per minute and a travel of 12 inches per minute and the arc making the arc path 12b of FIGURE 4 having a speed of 240 revolutions per minute and traveling 12 inches per minute.

By visual examination of FIGURES 3 and 4, it is apparent that the travel of the arc is truly continuous, and not intermittent or incremental, the arc paths cross and crisscross in a tight pattern leaving no areas essentially not covered by the arc, each point is traversed over or near to by the arc twice, once each by the leading and once each by the trailing side of the circular path of the arc, there are no gaps at the bead edges 14a (FIGURE 3) and 14b (FIGURE 4) thereby providing extremely smooth bead edges. In addition, by increasing the speed of the arc to 240 revolutions per minute as illustrated in FIGURE 4, the rotational speed is such to prevent freezing of the puddle before the arc comes back on the return stroke. By varying the radius of rotation of the arc the amount of arc power used for melting and that used for bonding is proportioned to provide a proper balance of the requirements for a given weld material and a given base or work material without the necessity for changing the amount of the power.

In short, providing the circular arc path eliminates the inherent difficulties and problems of the prior oscillating arc methods and equipment and provides the advantages and features and attains the objects and ends of the present invention previously mentioned.

The method of the invention consists in feeding a metal electrode, such as an electrode wire, while rotating it about an axis normal to the work while delivering granular weld material to the work generally at the center of rotation of the metal electrode. If desired, welding flux or shielding gas is provided to the weld zone so as to surround the point of entry of the granular weld material into the weld zone. The rotating metal electrode and the deposition of the granular material and shielding gas or flux are moved as a unit along the length of the work desired to be welded or weld overlaid.

A puddle is formed by the rotating arc and the incoming granular weld material is deposited at or near the center of this puddle. Flux, when used, is deposited on the puddle so as to surround the point of entry of the metal and extend out beyond the circle described by the arc. Part of the flux then fuses and covers the puddle shielding it from the air. The granular weld material being heavier than the flux sinks through any molten flux. The arc does not contact the granular material but the arc is from the electrode to the molten puddle.

Shielding gas can efficiently be used with the method of the invention since the arc does not contact the granular material, which would cause scattering of the granular metal in amounts up to perhaps 50%. When using shielding gas, any preferred shielding gas may be used and it is provided on the puddle so as to surround the point of entry of the metal and extend out beyond the circle described by the arc.

The electrode wire may be fed and controlled in any desired manner, for example, as illustrated in my earlier U.S. Patent 3,076,888 and the granular weld material and electrode wire may be metered and coordinated with one another as disclosed in my earlier United States Patents Nos. 3,060,307 and 3,076,888. In the event it is desired to provide more than one granular weld material to the work area in metered amounts and coordinated with metered amounts of electrode wire, such may be accomplished as disclosed in my application Serial No. 213,266, filed July 30, 1962 entitled Feeder for Welds.

In the method of the invention the electrode wire may be rotated by any desired apparatus and the travel may be accomplished by any suitable means.

The radius of rotation or the distance of the wire electrode from the center of rotation is an adjustable variable which proportions the amount of arc power used for melting and that used for bonding. This will vary with the melting and bonding characteristics. The melting characteristics of the granular material are governed by its composition, particle size and shape. The bonding characteristics are governed by the depth and temperature of the puddle and the melting point of the work or base metal. These are variables which can readily be determined for various applications and uses and the arc power can be proportioned for optimum melting and bonding without power change by varying the radius of rotation of the arc.

The amounts or quantities of granular weld alloy or alloys and metal electrode deposited on the work are metered and the amounts or quantities of electrode deposited are metered and proportional to the granular weld alloys so that a weld or weld overlay is formed of uniform and closely controlled and accurate analysis.

In addition, by arcing to the puddle a minimum of penetration of the base metal or work is obtained thus avoiding contamination of the weld or weld overlay by the base metal. Also, by adjusting the radius of rotation of the electrode, its distance from the work or puddle, the speed of rotation and the rate of travel, a highly flexible arc welding method is provided which is satisfactory for welding and weld overlaying under a variety of conditions and for a variety of purposes.

Referring now to FIGURE 1, an apparatus according to the invention and useful in the method of the invention is illustrated.

The apparatus is generally indicated by the reference numeral 16 and is supported by the frame member 18 by which the entire unit is made to travel by any suitable means, not shown. A generally round-shaped body member or support 18 provided with a generally circular but downwardly and inwardly tapering surface 20 and the anti-friction elements or thrust bearings 22 rotatably supports the entire apparatus in the bracket or frame 18 as illustrated.

The bracket members 24 are secured to the supporting member 18 and extend upwardly and are connected to the upper body member 26 in any suitable manner, not shown. In the feeder illustrated, the outer surface 28 of the body member 26 is circular and is provided with a ring gear 30 which is in engagement with and driven by the pinion gear drive 32 by a suitable prime mover, not shown. An idler 34 is provided to maintain the body member 26 in position. Thus, rotation of the gear 32 in turn rotates the gear 30 which, in turn, rotates the entire feeder as a unit.

A pair of hoppers 36 and 38 are carried and supported by the bracket 26, the hopper 36 being utilized for powdered flux material and the hopper 38 being utilized for granular alloy metal. Discharge outlets 40 and 42 are provided at the lower ends of the hoppers 36 and 38, respectively, which discharge outlet 40 discharges flux into the upper flared end of the outer flux discharge spout 44 which has disposed within it the inner alloy weld discharge spout 46, the upper flared end being disposed beneath the metering wheel 48 receiving the granular alloy weld material from the discharge outlet 42 of the hopper 38.

Thus, as illustrated, the discharge spout 44 is in the form of a tube and is disposed concentrically about the discharge spout 46, which also is in the form of a tube and is disposed at the center of rotation so that the flux 44a is disposed on the work around the point of entry of the alloy material 46a.

A metering feed wheel 48 is provided and connected to the shaft 50 which, in turn, is driven by the electric motor or drive 52 supported by the bracket 24. A pair of slip rings 54 are provided on the outer periphery of the generally circular ring 56 secured to the supporting member 18, which slip rings engage the pair of brushes 58 secured to the electrical connectors 60 which in turn are electrically connected to the electric leads 62. A pair of electric leads 64 are connected from the slip rings 54 to the electric motor 52.

Thus, electrical energy is provided through the electric leads 62, the electrical connections 60, the brushes 58, the slip rings 54 engaging the brushes 58, and the electric leads 64 to the electric motor 52 for energizing the same. Any desired arrangement by which electrical energy is provided to the electric motor 52 may be utilized.

Disposed on the upper body member 26 and rotatably supported by the upwardly extending brackets 66, only one being shown in this view, is the reel 68 upon which the wire electrode 70 is wound. Metered proportional amounts of the wire electrode 70 are fed by the electrode metering wheel 72 secured upon the shaft 50 and driven by the electric motor 52, as previously described.

A body member 76 is provided into which is threadedly or otherwise secured the upper end of the tube 78 which receives the wire electrode 70 passing through the opening 80 in the support 76. For purposes of adjusting the radial distance of the electrode, and hence the arc, an adjustment nut assembly 82 is provided which is secured to what constitutes an extension 84 of the upper tube 78 through which the wire electrode 70 extends and is directed to the work as illustrated.

The outer cylindrical surface 86 of the support 76 serves as a slip ring which engages the brush 88 secured by the connection 90 to the weld current lead 92 for supplying electrical energy to the wire 70. Any desired arrangement for applying electrical energy to the electrode wire 70 may be utilized as desired.

The nozzle 94 of the tube extension 84 is spaced the desired distance from the axis of the alloy metal tube 46 by adjustment of the adjustment nut assembly 82 so that as it rotates the wire electrode 70 rotates the desired distance or radius from the center of rotation of the unit. Adjustments of the nut assembly 82 cause the electrode nozzle 94 to be moved radially inwardly or outwardly from the metal outlet 46. The adjustment nut assembly 82 includes a lock nut 96 which is loosened and the extension 84 is rotated as desired to bring the nozzle 94 in closer or out farther from the center of rotation. The lock nut 96 is then tightened. If desired, indicia lines indicating the length of the radius may be provided, as illustrated. Any desired means may be used for adjusting the radial distance of the arc, as desired.

As illustrated, the arc is between the end of the electrode 70 and the puddle P formed on the work W formed by the melting of the granular alloy ingredients 46a from the discharge spout 46, which are deposited into the puddle and thus melted, and which are surrounded by the flux 44a being discharged from the lower end of the concentric flux discharge spout 46 and being fused about the puddle as indicated at F.

It is noted that the arc is between the end of the wire electrode 70 and the puddle P and that the granular alloying materials 46a are melted by being deposited in the puddle P and by the heat of the puddle P induced by the heat of the arc from the wire electrode 70. The arc from the wire electrode 70 to the puddle does not tend to drive away the granular alloying particles 46a, since these are melted in the puddle when the arc crosses them.

In operating the apparatus of FIGURE 1, the path of travel of the electrode 70 is the same as or similar to the path diagrammatically illustrated as 12a and 12b in FIGURES 3 and 4, respectively. Thus, for example, assuming that the feeder is revolving at the rate of 60 revolutions per minute and traveling at the rate of 12 inches per minute, the electrode has the path indicated by the line 12a in FIGURE 3.

Similarly, if the feeder is revolving at the rate of 240 revolutions per minute and traveling at the rate of 12 inches per minute, the path of the electrode is indicated by the line 12b in FIGURE 4.

As previously mentioned, any desired speed of revolution may be utilized and the size or diameter of the puddle may be made smaller or larger by adjusting the adjusting nut assembly 82 to move the nozzle 94 inwardly or outwardly and thus the electrode 70 inwardly or outwardly from the center of rotation to properly proportion the melting and bonding power without the necessity of changing the arc power, as previously mentioned.

If it is desired to deposit more than one alloying granular metal then a plurality of hoppers may be utilized with metering wheels correlated, for example, as illustrated in my U.S. application Serial No. 213,266, Feeder for Welds, to which reference has previously been made.

In using shielding gas, the shielding gas is provided in the outer discharge spout 44 in the same manner as the flux.

As previously mentioned, any suitable and conventional means may be used to move the rotating feeder along the path of travel and any conventional electrical means may be utilized for providing electrical energy where needed.

The use of the apparatus of FIGURE 1 has all of the advantages and features as previously mentioned.

In both the apparatus and method of the invention any desired weld alloys or materials in particle form and any desired shielding may be utilized, such as any desired flux or gas shielding.

Accordingly, the present invention is well suited and adapted to attain the objects and ends and has the advantages and features mentioned as well as others inherent therein.

While presently-preferred examples of the invention have been given for the purpose of disclosure, changes in details, arrangement of parts and steps in the apparatus and method of the invention may be made which are within the spirit of the invention as defined by the scope of the appended claims.

What is claimed is:

1. A method of welding comprising,
depositing weld particles on work to be welded,
forming a puddle on the work with the weld particles and a metal electrode,
rotating the metal electrode about the deposited particles in spaced relation to the puddle,
feeding the metal electrode to the work during such rotating, and
maintaining an arc from the electrode to the puddle during the rotating and the feeding of the metal electrode.

2. A method of welding comprising,
depositing weld particles on work to be welded,
forming a puddle on the work with the weld particles and a metal electrode,
rotating the metal electrode about the deposited particles in spaced relation to the puddle,
feeding the metal electrode to the work during such rotating,
maintaining an arc from the metal electrode to the puddle during the rotating and the feeding of the metal electrode,
continuing to deposit the weld particles in the formed puddle within the path of rotation of the metal electrode, and
progressing relative to the work the continuing deposit of the weld particles and the rotating metal electrode.

3. A method of welding comprising,
depositing weld particles on work to be welded,
forming a puddle on the work with the weld particles and a metal electrode,
depositing a layer of flux over the weld particles,
rotating the metal electrode about the deposited weld particles in spaced relation to the puddle,
feeding the metal electrode to the work during such rotating, and
maintaining an arc from the electrode to the puddle through the layer of flux during the rotating and the feeding of the metal electrode.

4. A method of welding comprising,
depositing weld particles on work to be welded,
forming a puddle on the work with the weld particles and a metal electrode,
shielding the weld particles and formed puddle,
rotating the metal electrode about the deposited particles in spaced relation to the puddle,
feeding the metal electrode to the work during such rotating, and
maintaining an arc from the electrode through the shielding to the puddle during the rotating and the feeding of the metal electrode.

5. A method of welding comprising,
depositing weld particles on work to be welded,
forming a puddle on the work with the weld particles and a metal electrode,
rotating the metal electrode about the deposited particles in spaced relation to the puddle,
feeding the metal electrode to the work during such rotating,
continuing to deposit the weld particles in the formed puddle within the path of rotation of the metal electrode,
depositing a layer of flux about the continuing deposit of weld particles and over the formed puddle,
maintaining an arc from the electrode through the layer of flux to the puddle during the rotating and the feeding of the metal electrode, and
progressing relative to the work the continuing deposit of the weld particles, the deposit of the layer of flux and the rotating and the feeding of the metal electrode.

6. A method of welding comprising,
depositing weld particles on work to be welded,
forming a puddle on the work with the weld particles and a metal electrode,
rotating the metal electrode about the deposited particles in spaced relation to the puddle,
feeding the metal electrode to the work during such rotating,
continuing to deposit the weld particles in the formed puddle within the path of rotation of the metal electrode,
shielded the deposited weld particles and formed puddle,
maintaining an arc from the electrode through the shielding to the puddle during the rotating and the feeding of the metal electrode, and
progressing relative to the work the continuing deposit of the weld particles, the shielding and the rotating and the feeding of the metal electrode.

7. A method of welding comprising,
depositing a metered amount of weld particles on work to be welded,
feeding a metered amount of a metal electrode to the work,
forming a puddle on the work with the weld particles and the metal electrode by maintaining an arc from the electrode to the puddle,
rotating the metal electrode about the deposited particles in spaced relation to the puddle while maintaining said arc,
continuing to deposit metered amounts of the weld particles in the formed puddle within the path of rotation of the metal electrode while continuing such rotation and continuing to feed the metered amounts of the electrode to the puddle, and progressing relative to the work the continuing deposit of metered amounts of the weld particles and the continuing deposit of the metered amounts of the rotating metal electrode relative to the work.

8. The method of claim 7 including,
shielding the deposit of the weld particles.

9. The method of claim 8 where
the shielding is by providing a layer of flux around and about the continuing deposit of the weld particles and the formed puddle, and
the arc is maintained from the electrode through the layer of flux to the puddle.

10. A method of welding comprising,
depositing metered amounts of weld particles on work to be welded,
forming a puddle on the work with the weld particles and a metal electrode,
rotating the metal electrode about the deposited particles in spaced relationship to the puddle,
maintaining the radius of rotation of the metal electrode a distance to provide complete melting of the weld particles and bonding of the puddle to the work,
feeding metered amounts of the metal electrode to the work during such rotating,
maintaining an arc from the metal electrode to the puddle during the rotating and the feeding of the metal electrode,
continuing to deposit metered amounts of the weld particles in the formed puddle within the path of rotation of the metal electrode, and
progressing relative to the work the continuing deposit of the metered amounts of the weld particles and the rotating metal electrode.

11. A feeder for use in welding comprising,
a hopper for particulate weld material,
electrode feed means arranged to feed a metal electrode to work to be welded,
means rotating the electrode feed means, and
weld feed means arranged to feed the particulate weld material from the hopper to the work within the circumference of the rotating metal electrode.

12. The feeder of claim 11 including,
adjustable means for varying the radius of rotation of the metal electrode.

13. In a feeder for use in welding,
a hopper for particulate weld material,
electrode feed means arranged to feed an electrode to work to be welded,
means rotating the electrode feed means about the weld feed means,
weld feed means arranged to feed the particulate weld material from the hopper to the work within the circumference of the rotating metal electrode, and
means for providing shielding about and over the particulate weld material feed to the work.

14. The feeder of claim 13 including,
adjustable means for varying the radius of rotation of the metal electrode.

15. In a feeder for use in welding,
a rotatably mounted support,
a hopper for particulate weld material carried by the support,
weld feed means carried by the support and arranged to feed the particulate weld material from the hopper to work to be welded generally at the center of rotation of the support,
electrode feed means carried by the support and arranged to feed an electrode to the work in spaced relation to the weld feed means, and
means rotating the support whereby the electrode feed means rotates about the weld feed means.

16. In a feeder for use in welding,
a rotatably mounted support,
a hopper for particulate weld material carried by the support,
weld feed means arranged to feed the particulate weld material from the hopper to work to be welded generally at the center of rotation of the support,
electrode feed means carried by the support and arranged to feed an electrode to the work in spaced relation to the weld feed means,
weld shield means carried by the support and disposed about the weld feed means for providing shielding to the particulate weld material, and
means rotating the support whereby the electrode feed means is rotated about the weld feed means and the weld shield means.

17. In a feeder for use in welding,
a rotatably mounted support,
at least one hopper for particulate weld material carried by the support,
weld feed means carried by the support for feeding the particulate weld material from the hopper to work to be welded generally at the center of rotation of the support,
electrode feed means carried by the support arranged to feed an electrode to the work in spaced relation to the weld feed means,
means carried by the support metering the amount of the particulate weld material fed by the weld feed means and metering the amount of the electrode fed to the work,
means coordinating the means metering the amount of particulate weld material fed and the means metering the amount of the electrode fed to the work whereby proportional metered amounts of the electrode and the particulate weld material are fed to the work, and
means rotating the support whereby the electrode is rotated about the weld feed means as the particulate weld material and the electrode are fed to the work.

18. The feeder of claim 17 including,
means for adjusting the radial distance of the electrode feed means for varying the radius of rotation of the electrode.

19. In a feeder for use in welding,
a rotatably mounted support,
at least one hopper for particulate weld material carried by the support,
weld feed means carried by the support for feeding the particulate weld material from the hopper to work to be welded generally at the center of rotation of the support,
electrode feed means carried by the support arranged to feed an electrode to the work in spaced relation to the weld feed means,
means carried by the support metering the amount of the particulate weld material fed by the weld feed means and metering the amount of the electrode fed to the work,
means coordinating the means metering the amount of particulate weld material fed and the means metering the amount of the electrode fed to the work whereby proportional metered amounts of the electrode and the particulate weld material are fed to the work,
means rotating the support whereby the electrode is rotated about the weld feed means as the particulate weld material and the electrode are fed to the work, and
shielding feed means carried by the support and arranged to provide shielding material about the particulate weld material as it is being deposited on the work.

20. The feeder of claim 19 including,
means for adjusting the radial distance of the electrode feed means for varying the radius of rotation of the electrode.

21. In a feeder for use in welding comprising,
a rotatably mounted support, at least one hopper for particulate weld material carried by the support, a discharge spout carried by and arranged generally at the center of rotation of the support, the discharge spout provided with a generally central passage and at least one concentric passage disposed about the central passage, electrode directing means carried by the support and arranged to feed an electrode to the work an axially spaced distance from the discharge spout, a metering feed wheel carried by the support arranged to feed the particulate weld material from its hopper to the central passage of the discharge spout, an electrode metering feed wheel carried by the support arranged to feed the metal electrode to the electrode directing means, means coordinating the rate of feeding of the weld material metering feed wheel and the electrode metering feed wheel whereby the particulate weld material and the electrode are simultaneously fed to the work in metered proportionate amounts, and means rotating the support.

22. The feeder of claim 21 including, a frame in which the support is rotatably mounted, and where the means for rotating the support comprises engaging driving and driven gear elements on the support and on the frame.

23. The feeder of claim 21 including, means carried by the support operatively connected to and driving the weld material feed wheel and the electrode feed wheel.

24. A feeder for use in welding comprising a frame, a support rotatably supported in the frame, at least a pair of hoppers carried by the support, means for providing a wire electrode carried by the support, a discharge spout disposed generally at the axis of rotation of and carried by the support and provided with a generally central passage and a generally annular passage disposed about the central passage, electrode directing means carried by the support and spaced axially from the center of rotation of the support directing the wire electrode to the work to be welded, a weld material feed wheel carried by the support arranged to feed the particulate weld material from its hopper to the central passage, the annular passage arranged to receive weld material from its corresponding hopper, an electrode metering wheel carried by the support arranged to feed the wire electrode to the electrode directing means, means carried by the support driving the weld material feed wheel and the electrode feed wheel at coordinated rates of feeding whereby the particulate weld material from the hopper and the wire electrode are simultaneously fed to the work in metered proportionate amounts, means carried by the frame operatively connected to and rotating the support, and engageable electric connections on the frame and the support providing electrical energy to the means for driving the feed wheels and to the electrode.

25. The invention of claim 24 including, means for adjusting the radial distance of the electrode directing means for varying the radius of rotation of the wire electrode.

References Cited by the Examiner

UNITED STATES PATENTS

| 2,472,803 | 6/1949 | Beyer et al. | 219—125 |
| 2,927,990 | 3/1960 | Johnson | 219—73 |

RICHARD M. WOOD, *Primary Examiner.*